United States Patent
Yoshitani (10) Patent No.: US 9,674,398 B2
(45) Date of Patent: Jun. 6, 2017

(54) PROCESSING APPARATUS WHICH DECOMPRESSES COMPRESSED DATA, CONTROL METHOD THEREOF, AND NON-TRANSITORY COMPUTER READABLE MEDIUM

(71) Applicant: CANON KABUSHIKI KAISHA, Tokyo (JP)

(72) Inventor: Akihiro Yoshitani, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/071,637

(22) Filed: Mar. 16, 2016

(65) Prior Publication Data

US 2016/0286082 A1    Sep. 29, 2016

(30) Foreign Application Priority Data

Mar. 23, 2015    (JP) .................................. 2015-060015

(51) Int. Cl.
| | | |
|---|---|---|
| G06F 15/00 | (2006.01) | |
| G06F 1/00 | (2006.01) | |
| G06K 1/00 | (2006.01) | |
| G06K 15/00 | (2006.01) | |
| H04N 1/405 | (2006.01) | |
| H04N 1/41 | (2006.01) | |
| H04N 1/60 | (2006.01) | |
| H04N 1/64 | (2006.01) | |

(52) U.S. Cl.
CPC ........... *H04N 1/4105* (2013.01); *H04N 1/405* (2013.01); *H04N 1/6008* (2013.01); *H04N 1/6016* (2013.01); *H04N 1/64* (2013.01); *H04N 2201/0082* (2013.01)

(58) Field of Classification Search
CPC .... H04N 1/4105; H04N 1/405; H04N 1/6008; H04N 1/6016; H04N 2201/0082
USPC ................................. 358/1.1, 1.15, 1.14, 1.9
See application file for complete search history.

(56) References Cited

U.S. PATENT DOCUMENTS

| | | | |
|---|---|---|---|
| 5,731,988 A | 3/1998 | Zandi et al. | 364/526 |
| 6,181,818 B1 | 1/2001 | Sato et al. | 382/170 |
| 6,246,804 B1 | 6/2001 | Sato et al. | 382/284 |
| 6,972,874 B2 | 12/2005 | Izumi et al. | 358/402 |
| 2004/0156076 A1* | 8/2004 | Togami | H04N 1/46 358/2.1 |
| 2012/0154856 A1 | 6/2012 | Yoshitani | 358/1.15 |
| 2014/0293307 A1* | 10/2014 | Yamada | G06F 3/1215 358/1.13 |

FOREIGN PATENT DOCUMENTS

JP    09-006952    1/1997

* cited by examiner

*Primary Examiner* — Douglas Tran
(74) *Attorney, Agent, or Firm* — Fitzpatrick, Cella, Harper & Scinto (57) ABSTRACT

A processing apparatus which decompresses compressed data and outputs the decompressed data to a processing unit configured to perform conversion processing of converting the decompressed data into data for printing; the apparatus comprises: an input unit configured to input the compressed data; a calculation unit configured to perform calculation for decompressing the compressed data input by the input unit; and a correction unit configured to correct data generated by the calculation unit such that a value of the data becomes a specific value handled by the processing unit.

20 Claims, 7 Drawing Sheets

PROCESSING APPARATUS WHICH DECOMPRESSES COMPRESSED DATA, CONTROL METHOD THEREOF, AND NON-TRANSITORY COMPUTER READABLE MEDIUM

BACKGROUND OF THE INVENTION

Field of the Invention

The present invention relates to a processing apparatus, a control method thereof, and a non-transitory computer readable medium. The present invention relates to a technique of outputting compressed data to a processing unit which performs conversion processing of decompressing compressed data and converting the decompressed data into data for printing.

Description of the Related Art

Some printers can obtain, as print data, compressed image data which has undergone compression processing by an image compression technique such as JPEG in an apparatus, or from a memory card or a network. The printers decompress the obtained compressed image data, and then perform various types of processing such as color conversion into a CMYK color space, error diffusion of converting the data into a form that can be output by a print engine, and quantization like dithering, thereby printing an image on a recording medium.

In Japanese Patent Laid-Open No. 9-6952, interconversion between an RGB color space and a YCbCr color space is performed in JPEG compression/decompression processing. At this time, Japanese Patent Laid-Open No. 9-6952 has disclosed a method of preventing, by setting the number of bits in halfway calculation larger than the original number of bits of processing target image data, errors from being accumulated even if color space conversion processing operations by integer computing are repeated over and over.

This method is useful in obtaining as high as possible accuracy of decompression output and also in performing decompression processing only once without repeating compression/decompression operations.

However, if the number of bits to be used for image data calculation is set larger than the primary original number of bits of that image data, an unintended pixel value may be reproduced depending on those processing contents. Therefore, if such processing is directly implemented in each printer, an unintended image is formed on the recording medium or a printing operation is performed on image data which need not originally undergo the printing operation. This may cause wasteful consumption of a recording material used for printing and a decrease in throughput.

SUMMARY OF THE INVENTION

The present invention has been made to solve the above-described problem, and provides a technique capable of implementing data processing appropriately and efficiently.

According to one aspect of the present invention, there is provided a processing apparatus which decompresses compressed data and outputs the decompressed data to a processing unit configured to perform conversion processing of converting the decompressed data into data for printing; the apparatus comprising: an input unit configured to input the compressed data; a calculation unit configured to perform calculation for decompressing the compressed data input by the input unit; and a correction unit configured to correct data generated by the calculation unit such that a value of the data becomes a specific value handled by the processing unit.

According to another aspect of the present invention, there is provided a control method of a processing apparatus which decompresses decompressed data and outputs the decompressed data to a processing unit configured to perform conversion processing of converting the decompressed data into data for printing; the method comprising: calculating to decompress the compressed data; and correcting data generated in the calculating such that a value of the data becomes a specific value handled by the processing unit.

According to another aspect of the present invention, there is provided a non-transitory computer readable medium storing a program for causing a computer to execute: calculating to decompress compressed data; and correcting data generated in the calculating such that a value of the data becomes a specific value handled by a processing unit, wherein the processing unit performs conversion processing of converting the decompressed data into data for printing.

According to the present invention, it is possible to implement data processing appropriately and efficiently.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

First, several image processing examples by a method in Japanese Patent Laid-Open No. 9-6952 will be described with reference to FIGS. 1A, 1B, and 1C.

Figure 1A:
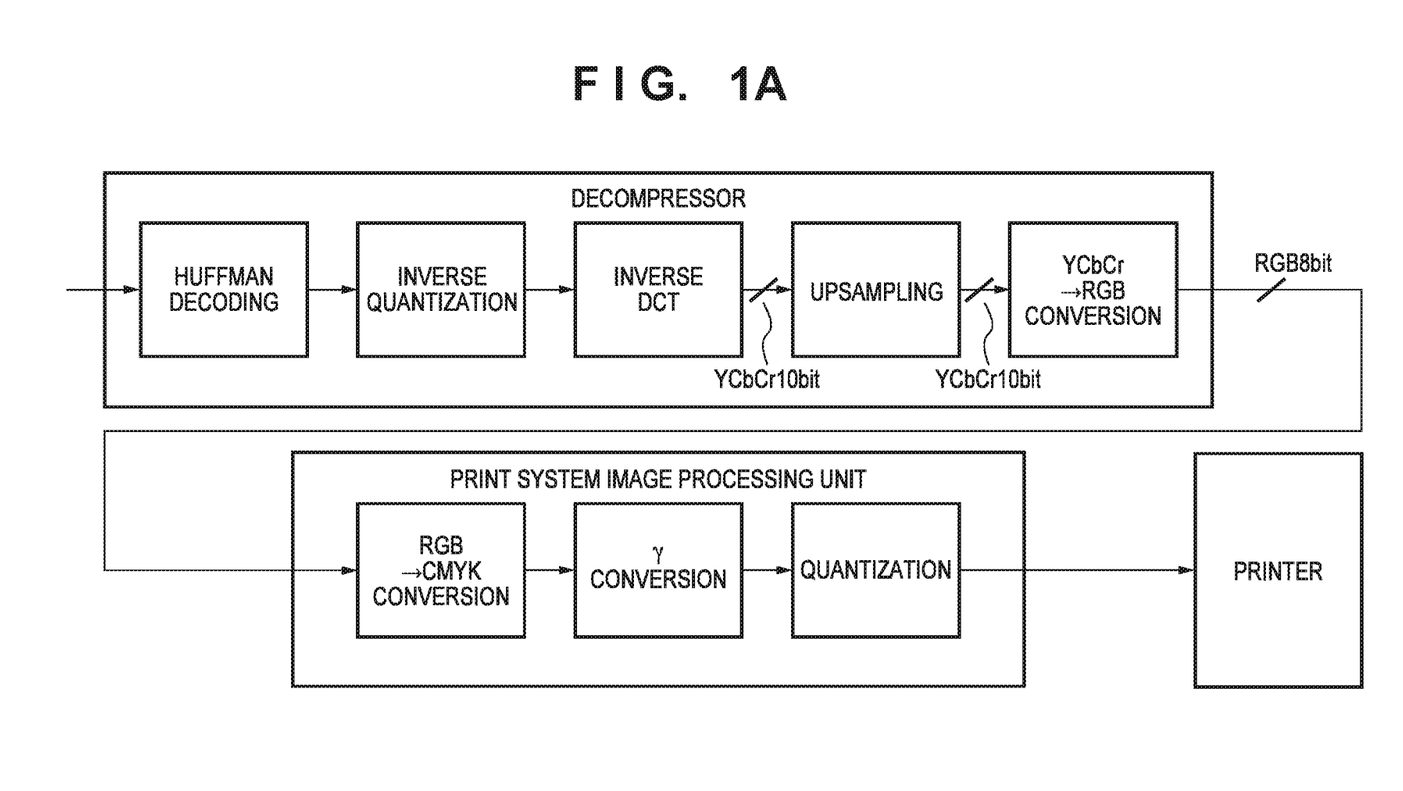
FIGS. 1A, 1B, and 1C are diagrams each showing an example of a processing system which performs decompression processing of compressed data.
Figure 1B:
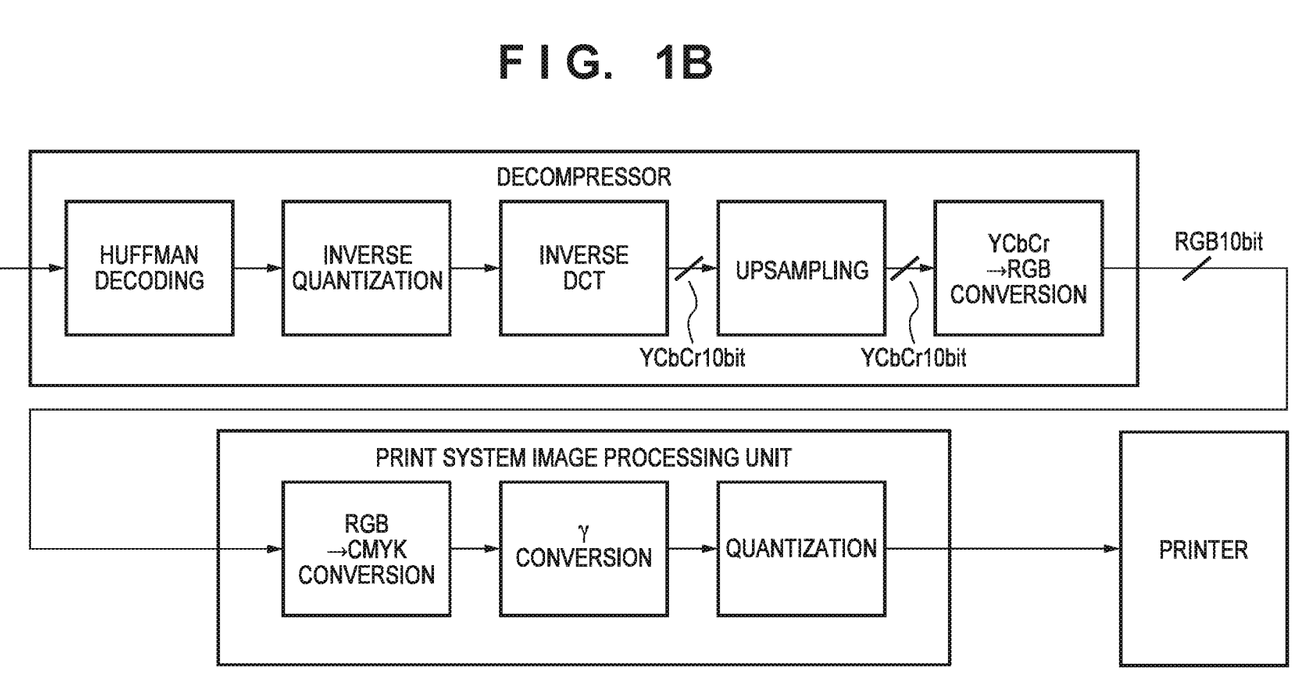
Figure 1C:
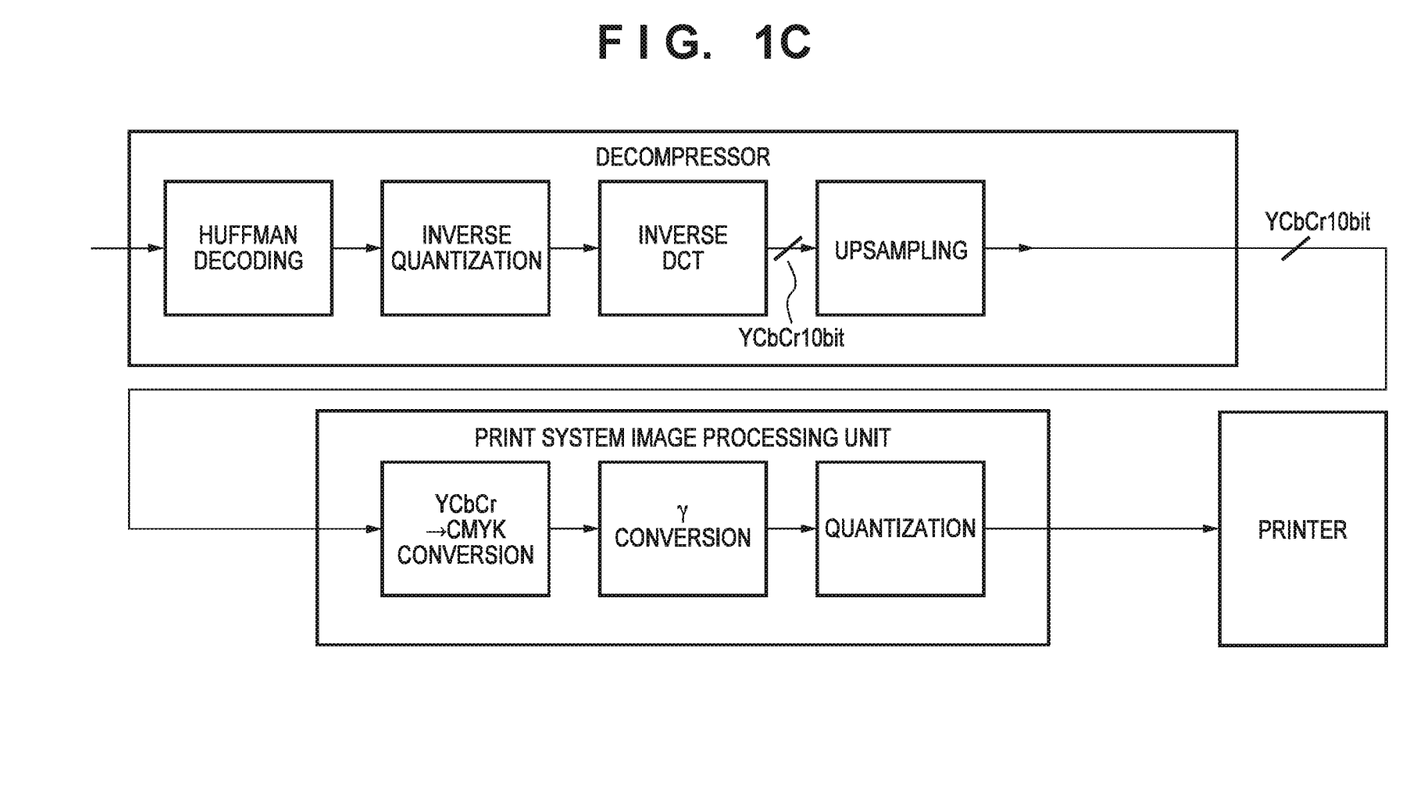

Note that a description will be given by taking, as an example, a case in which each decompressor shown in FIGS. 1A, 1B, and 1C is, for example, a JPEG decompressor which performs decompression according to a JPEG standard as an information processing apparatus.

As shown in FIG. 1A, in the decompressor, even if accuracy of RGB image data to be output is of 8 bits, inverse DCT calculation output in a YCbCr color space is performed with an accuracy of 10 bits higher than 8 bits. That 10-bit image data undergoes matrix calculation processing (YCbC→RGB conversion) of directly converting it from the YCbCr color space into an RBG color space, and then is rounded to 8-bit data which is the same as a bit accuracy at the time of input. This makes it possible to ensure the accuracy of RGB image data as an output result to 8 bits.

As shown in FIG. 1B, RGB image data can be output from the decompressor while keeping the accuracy of 10 bits without performing a process of rounding RGB image data from 10 bits to 8 bits after matrix calculation processing (YCbCr→RGB conversion) in the decompressor.

As shown in FIG. 1C, image data can be output from the decompressor while keeping the accuracy of 10 bits in the YCbCr color space without performing matrix calculation processing (YCbCr RGB conversion) itself in the decompressor.

In both cases of FIGS. 1B and 1C, various types of processing such as conversion processing from the RGB color space into a CMYK color coordinate system in a print system image processing unit at the subsequent stage and binary processing for printing are performed on each pixel value of image data having respective color spaces and accuracies. Such processing systems of FIGS. 1B and 1C are more useful, than a processing system shown in FIG. 1A, in preventing a pseudo contour from occurring in a gradation portion as a result of printing.

A printer which performs the processing system shown in FIG. 1C will now be examined. That is, in order to improve an image quality of print output, image data in the YCbCr color space and with the accuracy of 10 bits higher than 8 bits is output from the decompressor.

At the time of JPEG compression, image data is processed in the unit MCU (Minimum Coded Unit) as a block of 8×8 pixels. When the average value of Y components in 8×8 pixels is Yin, letting D be the value (quantization value) of a DC component of a quantization table of Y, an output Yh of DCT calculation and quantization processing at the time of JPEG compression is converted into Yh=ROUND((Yin−128)×8/D). In JPEG compression processing, the difference between the MCU of interest and the MCU immediately before that is Huffman-encoded with respect to this value Yh. Note that ROUND( ) is rounding processing for a fraction part.

If this value Yh is inverse quantized after accumulating a difference value for each MCU in the decompressor, Yh'=D×Yh+1024 is obtained. Then, if this value is output with the accuracy of 10 bits, an output value Yout=ROUND(Yh'/2) is obtained. With an accuracy of 8 bits, the output value Yout8=ROUND(Yh'/8) is obtained.

According to this equation, when the input value Yin=255 (white), the value of the output value Yout changes as in Table 1 depending on the quantization value D of the DC component of Y.

TABLE 1

| quantization value D | quantization result Yh | quantization error | inverse quantization result Yh' | 10-bit output value Yout | 8-bit output value Yout8 |
|---|---|---|---|---|---|
| 1 | 1016 | 0 | 2040 | 1020 | 255 |
| 2 | 508 | 0 | 2040 | 1020 | 255 |
| 3 | 339 | 1 | 2041 | 1021 | 255 |
| 4 | 254 | 0 | 2040 | 1020 | 255 |
| 5 | 203 | −1 | 2039 | 1020 | 255 |
| 6 | 169 | −2 | 2038 | 1019 | 255 |
| 7 | 145 | −1 | 2039 | 1020 | 255 |
| 8 | 127 | 0 | 2040 | 1020 | 255 |
| 9 | 113 | 1 | 2041 | 1021 | 255 |
| 10 | 102 | 4 | 2044 | 1022 | 255 |
| 11 | 92 | −4 | 2036 | 1018 | 255 |
| 12 | 85 | 4 | 2044 | 1022 | 255 |
| 13 | 78 | −2 | 2038 | 1019 | 255 |
| 14 | 73 | 6 | 2046 | 1023 | 255 |
| 15 | 68 | 4 | 2044 | 1022 | 255 |
| 16 | 64 | 8 | 2048 | 1023 | 255 |
| 17 | 60 | 4 | 2044 | 1022 | 255 |
| 18 | 56 | −8 | 2032 | 1016 | 254 |

Since the input value Yin=255 has been obtained before compression, it is to be expected that the output value Yout=1020 (255<<2) is obtained with the accuracy of 10 bits as an output after decompression. According to this Table 1, however, when D=6, 11, and 13, the output values Yout fall below 1020.

A case will be considered in which the pixel value of image data in a YCbCr color coordinate system with the accuracy of 10 bits output from the decompressor undergoes quantization and color conversion from YCbCr to CMYK in the print system image processing unit shown in FIG. 1C, and then is output to the printer. That is, in a case in which quantization and color conversion are performed from a device-dependent color space of a device that has generated image data to a printer-dependent color space, and then the data is output to the printer, assuming that Yout≥1020 is regarded as white, the quantization values D=6, 11, and 13 are regarded as not white but colors.

In general, in an inkjet printer which performs printing by scanning a printhead relatively to a recording medium, printing speed is increased by not scanning the printhead in a region where an output is completely blank, that is, a pixel (dot) by a CMYK ink is not formed at all. In a case as shown in Table 1, however, a region of white (Yin=255) before compression also becomes a color after decompression. Therefore, a printing operation for that region, that is, scanning of the printhead for the region occurs, performing the originally unnecessary printing operation. As a result, the printing speed is decreased.

First Embodiment

Figure 2:
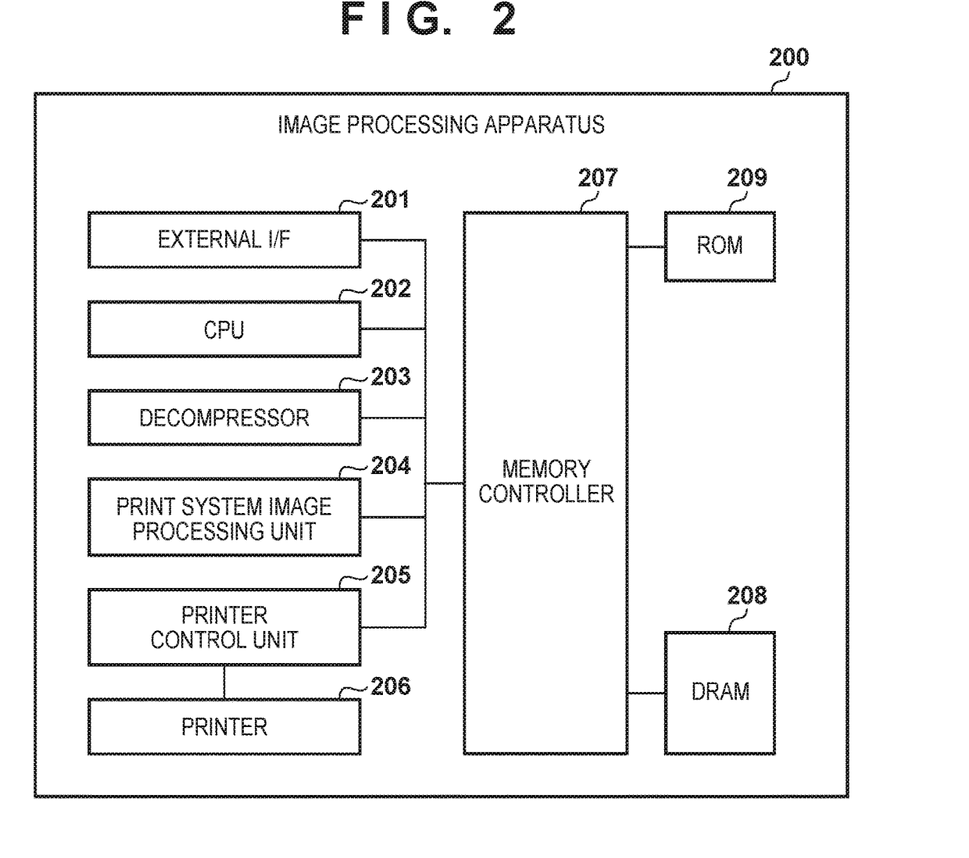
FIG. 2 is a block diagram showing the arrangement of an image processing apparatus.

FIG. 2 is a block diagram showing the detailed arrangement of an image processing apparatus 200. This image processing apparatus 200 has the same arrangement as an image processing unit of a general multifunction peripheral. The multifunction peripheral includes an inkjet multi-function printer (MFP) having a plurality of functions of a printer function, a scanner function (reading function), a copy function, a FAX function, and the like. Note that a printing method used by the MFP is not limited to the inkjet method. The MFP can use another printing method such as the laser beam method. Furthermore, the image processing apparatus 200 is not limited to this. The image processing apparatus 200 may have only a print function or the scanner function, or may have another function.

Referring to FIG. 2, an external I/F 201 supplies compressed image data of JPEG or the like outside of the image processing apparatus 200. This external I/F 201 exists variously as a wired/wireless LAN, a USB, an SD card I/F, and the like. However, the arrangement of the external I/F 201 is not particularly limited.

A CPU 202 controls the entire image processing apparatus 200. A decompressor 203 decompresses compressed image data and outputs decompressed image data in a predetermined color space (for example, the YCbCr color space). Note that in this embodiment, a description will be given by taking, as an example, a case in which compressed image data is image data compressed by JPEG. Therefore, the decompressor 203 functions as the JPEG decompressor. Inside of the decompressor 203, conversion from the YCbCr color space into the RGB color space is not performed. That is, a description will be given by taking, as an example, a case in which the decompressor 203 is the processing system of FIG. 1C.

A print system image processing unit 204 performs processing such as conversion into the CMYK color space and quantization for printing on decompressed image data output from the decompressor 203. A printer control unit 205 outputs, to a printer 206, quantized CMYK image data output by the print system image processing unit 204. The printer 206 prints quantized CMYK image data on the recording medium.

A memory controller 207 is configured to read/write data input/output by the respective constituent elements 201 to 205 from/in a DRAM 208 or is configured to read out data from a ROM 209. The memory controller 207 reads/writes data from/in the DRAM 208. The ROM 209 stores programs such as various control programs for controlling the operation of the image processing apparatus 200. The CPU 202 implements various types of processing in the image processing apparatus 200 by reading out the programs stored in the ROM 209 and executing them on the DRAM 208.

The detailed arrangement of the decompressor 203 will now be described with reference to FIG. 3.

Figure 3:
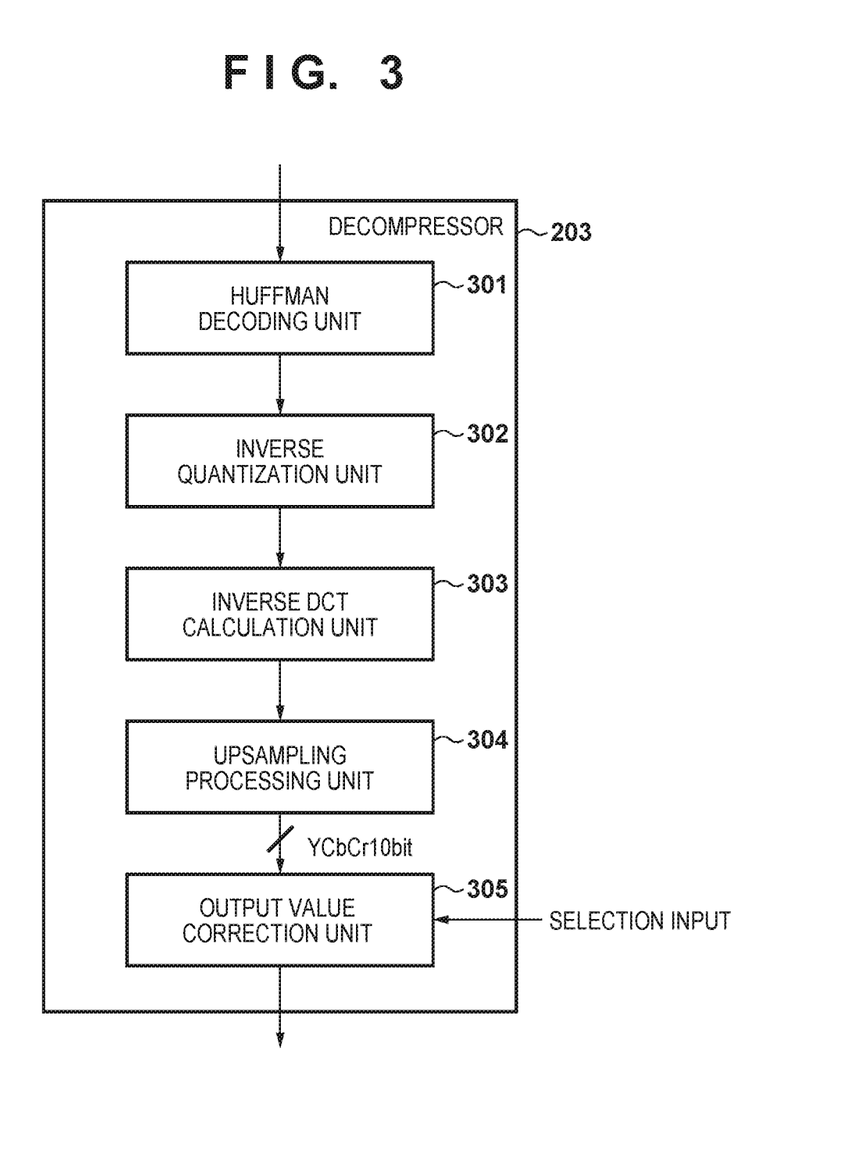
FIG. 3 is a block diagram showing the detailed arrangement of a decompressor.

As shown in FIG. 3, the decompressor 203 includes a Huffman decoding unit 301, an inverse quantization unit 302, an inverse DCT calculation unit 303, an upsampling processing unit 304, and an output value correction unit 305.

Processing executed in the respective units from the Huffman decoding unit 301 to the upsampling processing unit 304 is the same as processing executed in a general JPEG decompressor. Therefore, concrete decompression processing contents regarding a DC component value of each MCU in input JPEG image data are as described with reference to FIGS. 1A, 1B, and 1C. Thus, the following description will comply with FIGS. 1A, 1B, and 1C.

The inverse quantization unit 302 outputs Yh'. The inverse DCT calculation unit 303 outputs Yout of 10-bit value. The upsampling processing unit 304 simply enlarges a Cb pixel and a Cr pixel in accordance with a sampling ratio. However, the upsampling processing unit 304 directly outputs a Y pixel input. Hence, the upsampling processing unit 304 outputs each pixel in the YCbCr color space with the accuracy of 10 bits.

In this embodiment, the feature of the decompressor 203 is to include the output value correction unit 305. This output value correction unit 305 executes, on the Y pixel value Yout out of the YCbCr value with the accuracy of 10 bits output from the upsampling processing unit 304, correction processing of generating a correction value Yout' by applying:

$$Yout' = Yout \times 1020/1018; \text{ if } (Yout' > 1020) \ Yout' = 1020; \quad [1]$$

Note that correction processing by this output value correction unit 305 is implemented by causing the CPU 202 to read out and execute the programs stored in the ROM 209.

By executing correction processing represented by this equation [1], it is possible to guarantee that Y=1020 is output for any input value output as Y=255 in a normal 8-bit JPEG decompressor.

Then, in the print system image processing unit 204 at the subsequent stage, processing of a pixel value equal to or larger than a predetermined value (Y≥1020) as white is executed. This makes it possible to prevent, with respect to image data including a white background portion (Y=255) before JPEG compression, a color pixel from occurring in the white background portion by JPEG decompression. This makes it possible to prohibit an unnecessary printing operation for forming a color-pixel image. As a result, it is possible to prevent a decrease in the printing speed and wasteful consumption of a recording material.

Note that calculation processing (Yout'=Yout×1020/1018) executed by the output value correction unit 305 needs a divider. However, a large number of gates are needed for a logic circuit to include the divider. Therefore, it is also possible to obtain the same effect by adopting alternative arrangements which obtain the same effect with a simple arrangement. Some calculation processing examples of these alternative arrangements are given by:

$$[2] \ Yout' = Yout + (Yout + 6) >> 9); \text{ if } (Yout' > 1020) \ Yout' = 1020;$$
$$[3] \ \text{if } (Yout > 1016) \ \{$$
$$\quad Yout' = Yout + (Yout - 1016) \times 2;$$
$$\} \text{ else } Yout' = Yout;$$
$$\text{if } (Yout') > 1020 \ Yout' = 1020;$$

Figure 4A:
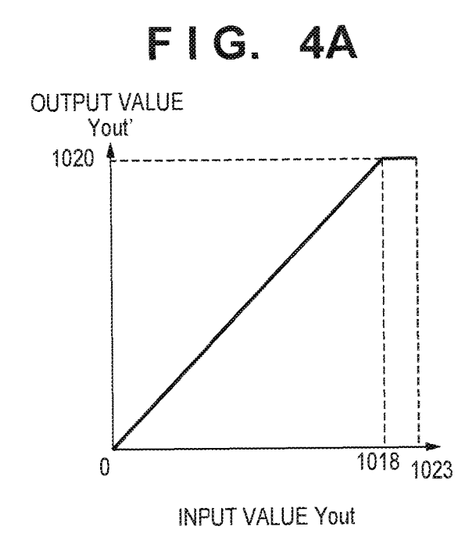
FIGS. 4A, 4B, and 4C are graphs each showing the relationship between values before and after correction in an output value correction unit.
Figure 4B:
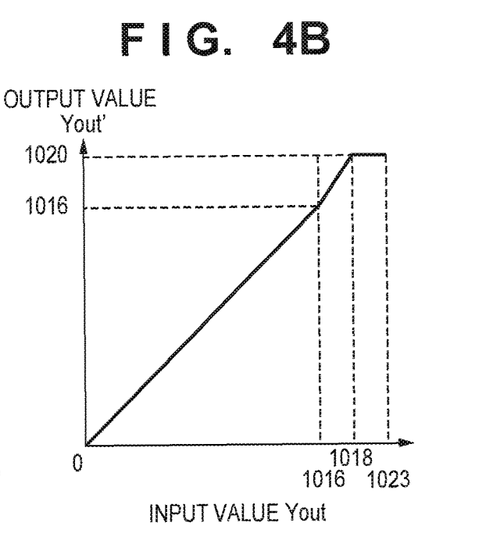

However, the present invention is not limited to these as long as calculation processing can give the same effect. The relationships between the input values Yout and the output values Yout' of the output value correction unit 305 are shown in FIG. 4A as for equations [1] and [2], and in FIG. 4B as for equation [3].

As described above, according to the first embodiment, in the decompressor which decompresses compressed image data accompanying inverse quantization processing, the output value with respect to the input value is corrected, in accordance with that input value, so as to become equal to or larger than the output value regarded as white. This makes it possible to prevent the pixel that can occur at the time of decompression and should originally be output in white from being processed as the color pixel.

More specifically, for example, when the decompressor performs an output operation in the YCbCr color coordinate system with the accuracy of 10 bits, a value obtained by performing correction calculation such as 1020/1018 times multiplication on the Y color component output value Yout after inverse quantization/inverse DCT calculation is output as Yout to be output finally.

In this embodiment, correction is performed in the JPEG decompressor. However, as another method, for example, it is also possible to perform processing in the print system image processing unit.

However, the print system image processing unit is also used in common with an input image in a compression format (PNG, TIFF, or the like) other than JPEG. Therefore, when processing is performed in the print system image processing unit after decompression, the print system image processing unit has to change a parameter such as a color conversion table depending on whether the compression format is JPEG. Hence, the printer (for example, the ROM 209) needs to store two or more types of parameters corresponding to JPEG and other compression formats. As a result, a memory amount for storing the parameters with respect to the respective compression formats increases, raising the cost.

On the other hand, in this embodiment, the output value (Yout) is corrected by the equations in the JPEG decompressor in a specific lossy compression format. Therefore, in the print system image processing unit, the parameters such as the color conversion table need not be distinguished between JPEG and the other compression format (PNG, TIFF, or the like). This makes it possible to solve the above-described problem.

When the quantization value D=18, it need not be regarded as white because a Y output becomes 254 even in the normal decompressor with the accuracy of 8 bits. It is also possible, however, to perform correction to regard it as white in accordance with an application and a purpose.

Second Embodiment

In the first embodiment, the output value correction unit 305 corrects the input value Yout uniformly irrespective of the quantization value D. According to Table 1, however, it is guaranteed that Yout is already 1020 or larger except for a case in which the quantization values D=6, 11, and 13. Therefore, correction is not needed, rather unwanted blown-out highlights may be caused by performing correction.

For example, in a case other than the quantization values D=6, 11, and 13, when Yout=1018 or 1019, a print system image processing unit regards the value as white though it is the color pixel which is not originally white. That is, another problem of causing the blown-out highlights in the output unwantedly arises.

Figure 5:
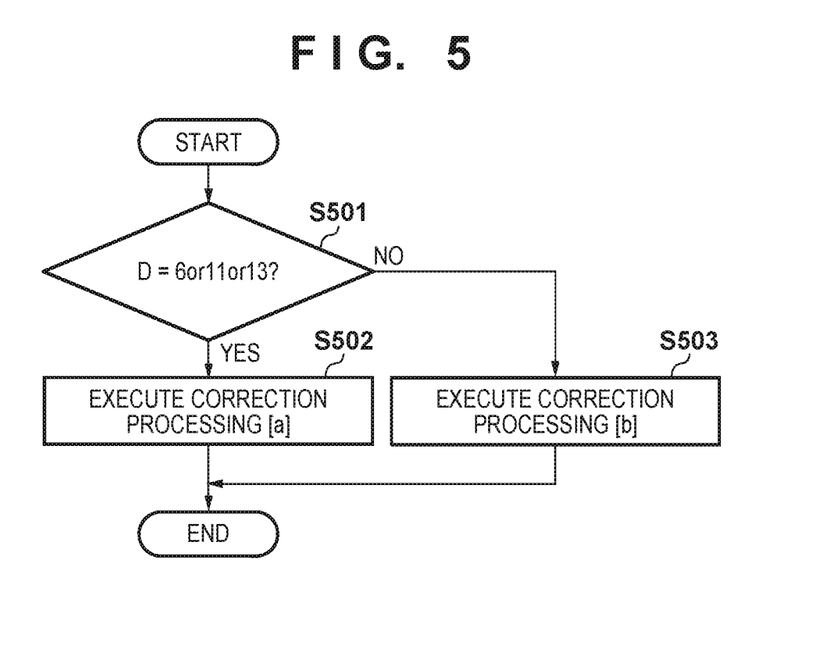
FIG. 5 is a flowchart showing the operation of an output value correction unit.

To avoid this, in the second embodiment, more appropriate correction processing of an output value is executed by changing the correction processing contents of an output value correction unit 305 depending on the quantization value D. A detail of this processing will be described with reference to the flowchart of FIG. 5. Note that processing shown in the flowchart of FIG. 5 is implemented by causing a CPU 202 to read out and execute programs stored in a ROM 209.

In step S501, the CPU 202 determines whether the quantization value D for image data to be processed is a predetermined value (D=6, 11, or 13).

As a result of determination, if the quantization value D is the predetermined value (D=6, 11, or 13) (YES in step S501), the CPU 202 executes:

correction processing [a]: processing (any of equations [1] to [3]) in the first embodiment in step S502.

On the other hand, as the result of determination, if the quantization value D is not the predetermined value (D=6, 11, or 13) (NO in step S501), the CPU 202 executes:

correction processing [b]: if (Yout>1020) {Yout'=1020;} else Yout'=Yout; in step S503.

In the output value correction unit 305, "selection input" capable of switching execution of correction processing [a] and correction processing [b] by an external signal is provided. First, the CPU 202 analyzes input JPEG compressed image data. Then, based on the quantization value D obtained by that analysis result, the CPU 202 executes correction processing [a] when D=6, 11, or 13 and sets a value for executing correction processing [b] for a "selection input" signal in a case other than D=6, 11, or 13. For example, the CPU 202 sets the "selection input" signal to "1" when executing correction processing [a] or sets the "selection input" signal to "0" when executing correction processing [b], and then inputs it to the output value correction unit 305. In response to this, the output value correction unit 305 executes correction processing [a] or correction processing [b] in accordance with the value indicated by the input "selection input" signal.

Alternatively, it may adaptively be determined in a decompressor 203 that correction processing [a] or correction processing [b] is executed in the output value correction unit 305 by referring to the quantization value D used in an inverse quantization unit 302 in the decompressor 203.

As described above, according to the second embodiment, the contents of correction processing are changed adaptively depending on the value used at the time of quantization, in addition to the effects described in the first embodiment. This makes it possible to prevent image data from being distorted unwantedly by correcting image data to be processed when correction is not needed.

Note that as a method different from that in this embodiment, conversion into CMYK may be performed by storing the plural types of color conversion tables corresponding to the quantization values D in the print system image processing unit and using the color conversion table that has been selected among them in accordance with the quantization value D. However, the plurality of color conversion tables need to be stored, causing a problem of an increase in cost as also described in the first embodiment.

On the other hand, in this embodiment, correction of the output value (Yout) is performed in the JPEG decompressor. It is therefore unnecessary to prepare the plurality of color conversion tables corresponding to the quantization values D in the print system image processing unit. This makes it possible to solve the above-described problem.

Third Embodiment

In the first and second embodiments, processing of a pixel which satisfies a condition as a white pixel is executed. However, a difference in a value occurs before compression and after decompression depending on a quantization value as for Yin=0 (black), as shown in Table 2. This difference in the value has no influence on a problem of low printing speed caused by the fact that a color pixel (dot) is output in a white background in an inkjet printer. In a printer that should reproduce a solid black input as a solid black output, however, a solid black image may not be printed on a recording medium normally. To prevent this, correction processing as described in the first and second embodiments is also applied to "black". This makes it possible to reproduce solid black appropriately and normally.

TABLE 2

| quantization value D | quantization result Yh | quantization error | inverse quantization result Yh' | 10-bit output value Yout | 8-bit output value Yout8 |
| --- | --- | --- | --- | --- | --- |
| 1 | −1024 | 0 | 0 | 0 | 0 |
| 2 | −512 | 0 | 0 | 0 | 0 |
| 3 | −341 | 1 | 1 | 1 | 0 |
| 4 | −256 | 0 | 0 | 0 | 0 |
| 5 | −205 | −1 | −1 | 0 | 0 |
| 6 | −171 | −2 | −2 | 0 | 0 |
| 7 | −146 | 2 | 2 | 1 | 0 |
| 8 | −128 | 0 | 0 | 0 | 0 |
| 9 | −114 | −2 | −2 | 0 | 0 |
| 10 | −102 | 4 | 4 | 2 | 1 |
| 11 | −93 | 1 | 1 | 1 | 0 |
| 12 | −85 | 4 | 4 | 2 | 1 |
| 13 | −79 | −3 | −3 | 0 | 0 |
| 14 | −73 | 2 | 2 | 1 | 0 |
| 15 | −68 | 4 | 4 | 2 | 1 |
| 16 | −64 | 0 | 0 | 0 | 0 |
| 17 | −60 | 4 | 4 | 2 | 1 |
| 18 | −57 | −2 | −2 | 0 | 0 |

In Table 2, a 10-bit output value Yout is desirably "0" in all quantization values D. However, the output value Yout becomes nonzero when D=3, 7, 10, 11, 12, 14, 15, and 17.

Figure 4C:
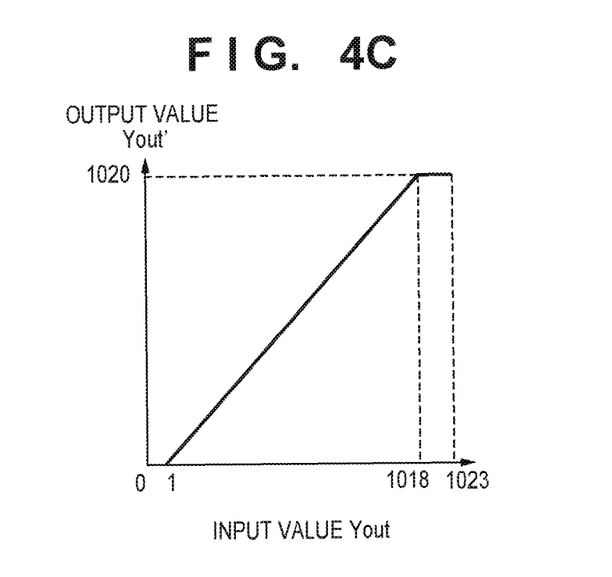
Figure 6:
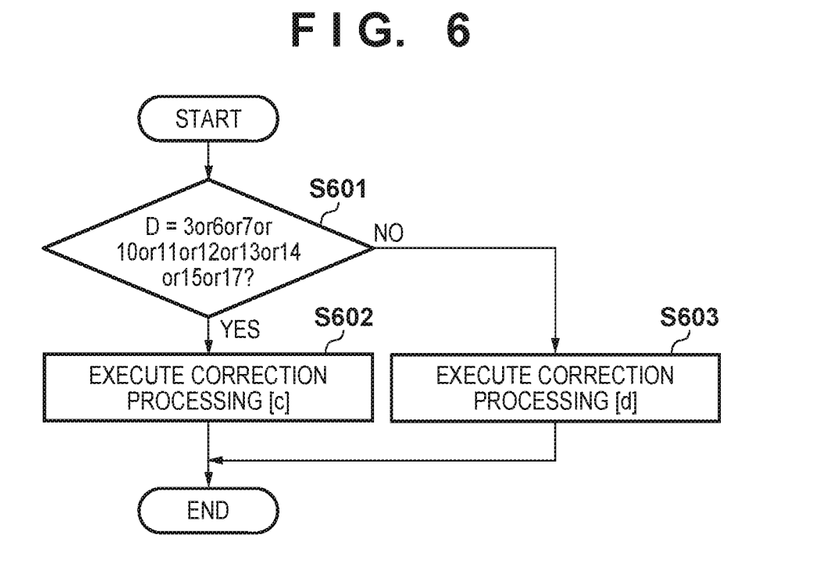
FIG. 6 is a flowchart showing the operation of an output value correction unit.

In consideration of the arrangements of the first and second embodiments, more appropriate correction processing of the output value is executed by changing the correction processing contents of an output value correction unit 305 depending on the quantization value D. A detail of this processing will be described with reference to the flowchart of FIG. 6. Note that processing shown in the flowchart of FIG. 6 is implemented by causing a CPU 202 to read out and execute programs stored in a ROM 209. Particularly, in FIG. 6, processing for outputting an output value Yout' (0, 1020) corresponding to the input value Yin (0, 255) before JPEG compression is executed for both white and black. FIG. 4C shows the relationship of the input/output values at this time. That is, a value which indicates white in compressed data is corrected to a value which indicates white in decompressed data and a value which indicates black in compressed data is corrected to a value which indicates black in decompressed data.

In step S601, the CPU 202 determines whether the quantization value D for image data to be processed is a predetermined value (D=3, 6, 7, 10, 11, 12, 13, 14, 15, or 17).

As a result of determination, if the quantization value D is the predetermined value (D=3, 6, 7, 10, 11, 12, 13, 14, 15, or 17) (YES in step S601), the CPU 202 executes:

```
correction processing [c]: (Fig. 4C)
    if (Yout = 0)                  { Yout' = 0;
    }else if (Yout ≤ 170)          { Yout' = Yout−1;
    }else if (Yout ≤ 509)          { Yout' = Yout;
    }else if (Yout ≤ 848)          { Yout' = Yout+1;
    }else if (Yout ≤ 1018)         { Yout' = Yout+2;
    }else                            Yout' = 1020;
in step S602.
```

On the other hand, as the result of determination, if the quantization value D is not the predetermined value (D=3, 6, 7, 10, 11, 12, 13, 14, 15, or 17) (NO in step S601), the CPU 202 executes:

```
correction processing [d]: (the same as
correction processing [b])
    if (Yout > 1020)               { Yout' = 1020;
    } else                           Yout' = Yout;
in step S603.
```

As described above, it is also possible to switch between correction for only white and correction for only black adaptively depending on the quantization value D.

As described above, according to the third embodiment, the output value with respect to the input value is corrected, in accordance with that input value, so as to become equal to or larger than the output value regarded as black, in addition to the effects described in the first and second embodiments. This makes it possible to reproduce a pixel that should originally be output in black as black more appropriately.

Fourth Embodiment

In the first to third embodiments, JPEG compressed image data is decompressed, output as YCbCr color components from the inverse DCT computing unit 303 and the upsampling processing unit 304, and correction processing is performed on only image data with the Y component out of the YCbCr color components. As the processing system shown in FIG. 1B, however, some processing systems perform YCbCr→RGB conversion, and then output data with an accuracy of 10 bits in a decompressor.

In this case, the same effect is obtained by providing a processing unit which corresponds to an output value correction unit 305 at the subsequent stage of a YCbCr→RGB conversion unit and performing correction processing for the Y pixel as described in the first to third embodiments on each 10-bit pixel value of R, G, and B. In this case, however, an algorithm for a target which actually corrects a RGB value is changed as needed in accordance with a coefficient value of YCbCr→RGB matrix calculation or the algorithm of halfway calculation correction processing (calculation rounding processing).

Fifth Embodiment

In the first to fourth embodiments, quantization processing of the DC component value performed in JPEG compression/decompression has been mentioned. However, the arrangement of each embodiment is also applicable to another lossy compression processing/lossy decompression processing of image data accompanying quantization processing.

That is, the arrangement of each embodiment is applicable as long as a processing system forms an integer after dividing (sampling) an input value X by a quantization value D or executing another calculation processing (such as X'=log(X)) for reducing a data amount.

That is, a rounding error caused by integer formation occurs inevitably in the processing system which generates the approximate value of data before compression by compressing data and performing inverse calculation when decompressing the obtained compressed data. Therefore, it is not necessarily possible to guarantee that a specific value of white, black, or the like before compression is output as an intended value after decompression. Even in such a processing system, however, it may be necessary to guarantee that the output value becomes the intended value as also described in the first to third embodiments.

In the other calculation processing for reducing the data amount or quantization, the relationship between values before compression and after decompression, and a parameter value (the quantization value D in quantization) to be used in that calculation processing can be calculated in advance. Hence, it is also possible to predict how correction processing should be performed after decompression.

It is therefore possible to guarantee that the specific value before compression becomes the specific value after decompression by executing correction processing uniformly or executing different correction processing depending on the value of the parameter value on the output value after decompression, as shown in the first to fourth embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-060015, filed Mar. 23, 2015, which is hereby incorporated by reference herein in its entirety.

What is claimed is:

1. A processing apparatus which decompresses compressed data, the apparatus comprising:
a decompressor,
wherein the decompressor:
(i) receives the compressed data that is obtained by compression of first image data of a first bit accuracy,
(ii) decompresses the compressed data generating second image data, with a second bit accuracy higher than the first bit accuracy,
(iii) corrects the second image data, such that a first specific value of the first image data becomes a second specific value of the corrected second image data by the compressing, the decompressing, and the correcting, and
(iv) outputs the corrected second image data to a processor configured to convert the corrected second image data into data for printing.

2. The apparatus according to claim 1, wherein the compressed data is compressed data accompanying quantization and generated by lossy compression processing.

3. The apparatus according to claim 2, wherein the lossy compression processing is JPEG compression processing.

4. The apparatus according to claim 3, wherein, in the JPEG compression processing, the first image data is processed in a unit of a block of 8×8 pixels, and a decompressed value obtained by the JPEG compression processing and the decompressing for a DC component corresponding to blocks of 8×8 pixels in the first image data, is different according to a quantization value D used in the JPEG compression processing for the DC component.

5. The apparatus according to claim 4, wherein the decompressor corrects, based on the quantization value D of the compressed data, a value of the second image data generated by the decompressing such that the first specific value of the first image data becomes the second specific value of the corrected second image data.

6. The apparatus according to claim 5, wherein, if the quantization value D is a predetermined value, the decompressor corrects the second image data such that the first specific value of the first image data becomes the second specific value of the corrected second image data, and if the quantization value D is not the predetermined value, the decompressor corrects a value of the second image data corresponding to the first specific value to the second specific value in a case in which the value of the second image data is larger than the second specific value, and outputs the value of the second image data without any change in a case other than the case in which the value of the second image data is larger than the second specific value.

7. The apparatus according to claim 5, wherein the decompressor obtains the quantization value D by analyzing the compressed data compressed by the JPEG compression processing.

8. The apparatus according to claim 3, wherein the processor is used, in common, by conversion processing for data which has been corrected by the decompressor, and conversion processing for data which has been compressed in a compression format different from JPEG and has not undergone correction by the decompressor.

9. The apparatus according to claim 1, wherein the decompressor performs the decompressing such that the first specific value, which indicates white in the first image data, becomes the second specific value, which indicates white in the corrected second image data.

10. The apparatus according to claim 1, wherein the decompressor performs the decompressing such that the first specific value, which indicates black in the first image data, becomes the second specific value, which indicates black in the corrected second image data.

11. The apparatus according to claim 1, wherein the decompressor corrects, based on a parameter value of the compressed data, a value of the second image data generated by the decompressing such that the first specific value of the first image data becomes the second specific value of the corrected second image data.

12. The apparatus according to claim 11, wherein, if the parameter value is a predetermined value, the decompressor corrects the second image data such that the first specific value of the first image data becomes the second specific value of the corrected second image data, and if the parameter value is not the predetermined value, the decompressor corrects a value of the second image data corresponding to the first specific value to the second specific value in a case in which the value of the second image data is larger than the second specific value, and outputs the value of the second image data without any change in a case other than the case in which the value of the second image data is larger than the second specific value.

13. The apparatus according to claim 11, wherein the decompressor obtains the parameter value by analyzing the compressed data.

14. The apparatus according to claim 1, wherein the decompressor includes color conversion in which the corrected second image data is converted from a first color space into a second color space, and
the decompressor corrects the data obtained by the color conversion.

15. The apparatus according to claim 1, wherein the processor performs quantization and color conversion from a device-dependent color space of a device that has generated the compressed data into a printer-dependent color space of a printer configured to output decompressed data of the compressed data.

16. The apparatus according to claim 15, wherein the printer is an inkjet printer configured to perform printing by scanning a printhead relatively to a recording medium.

17. The apparatus according to claim 1, wherein the decompressor is included an application specific integrated circuit (ASIC).

18. A control method of a processing apparatus which decompresses compressed data, the method comprising:
receiving, as input, the compressed data that is compressed first image data of a first bit accuracy;
decompressing the compressed data, generating second image data with a second bit accuracy higher than the first bit accuracy;
correcting the second image data, such that a first specific value of the first image data becomes a second specific value of the corrected second image data by the compressing, the decompressing, and the correcting; and
outputting the corrected second image data the has been corrected by the correcting, to a processor configured to convert the corrected second image data into data for printing.

19. The method according to claim 18, wherein the compressed data is compressed by JPEG compression processing, and in the JPEG compression processing, the first image data is processed in a unit of a block of 8×8 pixels, and a decompressed value obtained by the JPEG compression processing and the decompressing for a DC component corresponding to blocks of 8×8 pixels in the first image data, is different according to a quantization value D used in the JPEG compression processing for the DC component.

20. A non-transitory computer readable medium storing a program for causing a computer to execute the steps of:
receiving, as input, compressed data that is compressed first image data of a first bit accuracy;
decompressing the compressed data, generating second image data with a second bit accuracy higher than the first bit accuracy;
correcting the second image data, such that a first specific value of the first image data becomes a second specific value of the corrected second image data by the compressing, the decompressing, and the correcting; and
outputting the corrected second image data to a processor configured to convert the corrected second image data into data for printing.

* * * * *